Aug. 27, 1935.  D. H. MONTGOMERY  2,012,826
COLLET
Filed Oct. 4, 1933
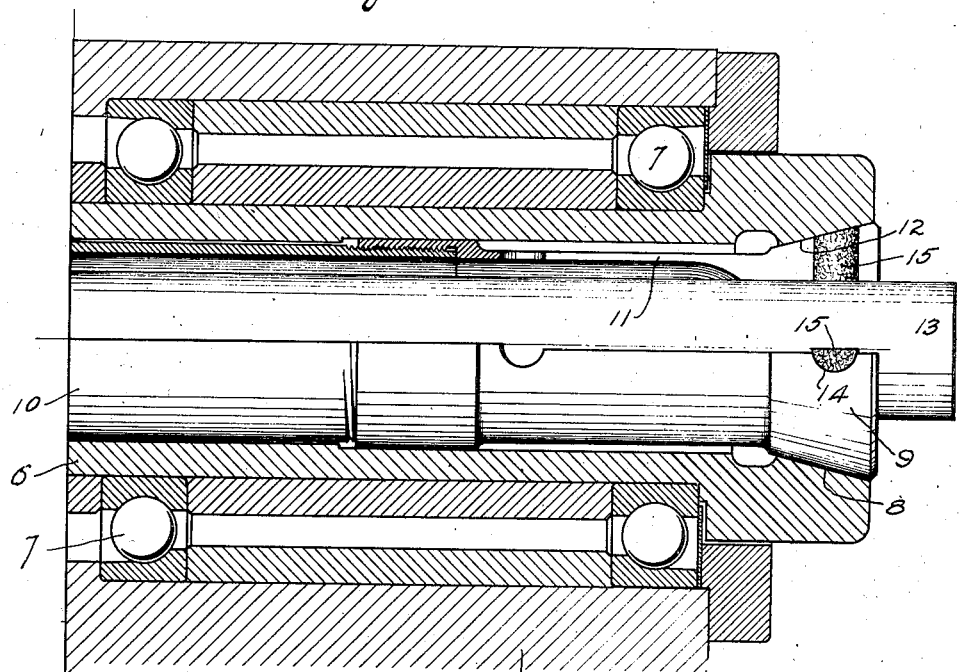
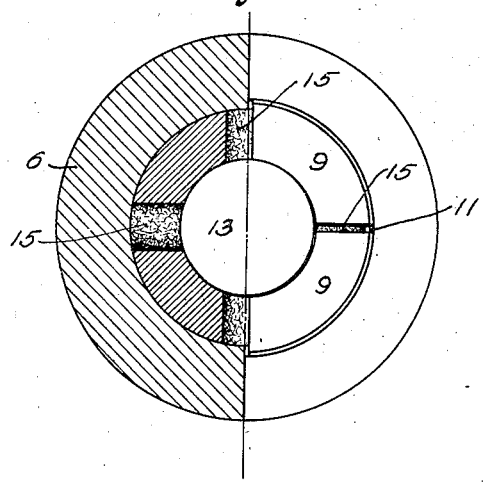
INVENTOR
Donald H Montgomery
BY
Mitchell Eckert
ATTORNEYS Patented Aug. 27, 1935

2,012,826

UNITED STATES PATENT OFFICE 2,012,826

COLLET

Donald H. Montgomery, Berlin, Conn., assignor to The New Britain-Gridley Machine Company, New Britain, Conn., a corporation of Connecticut Application October 4, 1933, Serial No. 692,168

9 Claims. (Cl. 279—46)

My invention relates to a chuck, and more particularly to means for preventing chips and other foreign matter from working back between the jaws of a collet chuck.

It is the principal object of the invention to provide sealing or barrier means for a collet chuck, to prevent chips and other foreign matter from working back between adjacent jaws, which means may be securely held in place during operation of the chuck as well as when stock is being loaded.

Other objects and features of invention will either be herinafter pointed out or will become apparent upon a reading of the specification.

In the drawing which shows, for illustrative purposes only, a preferred form of the invention—

Fig. 1 is a central longitudinal sectional view through a spindle and its mounting, a collet illustrating features of the invention being shown in quarter section;

Fig. 2 is a front end view of the chuck in half elevation and in half section through the barrier means disclosed in Fig. 1.

Briefly stated, in a preferred form of the invention I employ a collet chuck having jaws of the usual or any preferred type, which in general extend quite closely to each other. In order to prevent chips and other foreign matter from working through the spaces between adjacent jaws, I provide barrier means, preferably in the form of felt or like plugs, which plugs are securely held in place so as not to be displaced during operation of the chuck nor while loading stock.

In the specific form illustrated 5 indicates a support for the spindle, such as the frame of the machine or a spindle carrier of a multiple spindle machine. 6 indicates a tubular spindle mounted in the carrier on anti-friction bearings 7—7 in the usual or any preferred manner.

The nose of the spindle in the specific form illustrated is outwardly tapered or belled so as to provide a taper seat 8 for the collet jaws 9—9. The collet comprises a tube 10, slitted at its outer end in the usual manner, as indicated at 11, to provide relatively movable jaws 9—9, which jaws are provided at their outer sides with tapered seat surfaces 12 for engaging the bell mouth or collet seat 8 of the spindle, all as will be readily understood. In the positions illustrated in the drawing the collet has been closed into gripping position on the bar stock 13.

In order to prevent chips and other foreign matter from working back through the slits between adjacent jaws 9—9 and into the spindle, I provide barrier means, preferably in the form of felt or like plugs. I likewise provide means for securely holding the plugs in place so as to avoid their accidental dislodgment either during operation or when stock is being loaded.

In the form shown, at least one of the jaws, but preferably both of them, are provided in their adjacent edges with opposing recesses 14, each of which is preferably arcuate or semi-circular in cross section and extends radially of its jaw from the clutching surface to the inclined surface. 15—15 are plugs or fillets, preferably of felt or other suitable compressible and expansible absorbent material seated in the radial recesses 14 and preferably filling the same quite snugly from end to end so that when the jaws are moved to and fro in the seat 8 they will not be dislodged or displaced. The walls of these recesses so effectively hold these plugs that the same will be held against displacement at all times and in all positions of said jaws. Even when stock is being loaded into the chuck, the fillets are so securely held that should said stock engage the inner end of a plug, there will be no danger of dislodgment or displacement of the same.

When the collet is closed and the plugs are compressed by the contracted chuck jaws oil in the plugs will be squeezed out onto the inclined faces of the jaws and the seat 8 so as to lubricate the same. When the collet is opened, the plugs will tend to sweep the surface of the seat 8 free of chips and foreign matter. Since the plugs always span the spaces between the chuck jaws in all positions of the latter, it follows that no chips can work past the plugs and into the spindle.

While the invention has been described in considerable detail and a preferred form illustrated in connection with a draw-back type of collet, it is to be understood that the invention is applicable to other types of collets and that various changes and modifications may be made within the scope of the invention as defined in the appended claims.

I claim:

1. In a device of the character indicated, a chuck having at one end a plurality of expansible jaws formed by a slot between adjacent jaws extending from the front toward the rear thereof, means in said slot for preventing the passage of foreign matter through said slot, and shoulder means for holding said last mentioned means against displacement longitudinally of said slot in all positions of said jaws.

2. In a collet chuck having at one end a plurality of jaws movable toward and from each other, a barrier between adjacent jaws for preventing foreign matter from working back between said jaws, and shoulder means for holding said barrier against displacement longitudinally of said slot in all positions of said jaws.

3. In a collet chuck including spaced spring jaws at one end thereof, barrier means within the spaces between adjacent jaws to prevent foreign matter from working back through said spaces, and shoulder means for holding said barrier means against displacement longitudinally of said slot in all positions of said jaws.

4. In a collet chuck having jaws extending into proximity to each other adjacent the gripping surfaces thereof, one of said jaws having a radial recess therein, and a barrier held in said recess and engaging therein and the adjacent face of the next adjacent jaw.

5. In a collet chuck having jaws, adjacent jaws having radial recesses in opposed faces thereof, and a barrier engaging in said recesses and held in place thereby to prevent foreign matter from working back through said collet between adjacent jaws.

6. In a collet chuck including a plurality of spaced jaws movable to and fro, a barrier located in the spaces between the walls of adjacent jaws, said barrier extending from the gripping faces of said jaws completely therethrough to the seating faces thereof, and means for holding said barrier in place in all positions of said jaws.

7. In a collet chuck having normally spaced jaws movable to and fro, a barrier in the spaces between adjacent jaws, means for holding said barrier in place in all positions of said jaws, said barrier being formed of absorbent compressible material.

8. In a collet chuck including jaws movable toward and from each other, adjacent jaws having radially extending recesses therein arcuate in cross section and extending from the gripping to the seating faces of said jaws, and a barrier member seated in the opposed recesses in said jaws and held in place by the walls thereof in all positions of said jaws.

9. A chuck comprising a tubular spindle, the passage therethrough being flared at its outer end, a tubular collet slitted longitudinally of its outer end to form a plurality of movable work clutching jaw members provided on their outer sides with tapered seat surfaces in cooperation with the tapered wall of the spindle, said collet being slidable to and fro in said spindle, barrier elements located within the slits to the rear of the outer ends of said jaw members and occupying the space from the gripping surfaces of said jaws to the tapered outer walls thereof.

DONALD H. MONTGOMERY.